US011922606B2

(12) United States Patent
Semenov et al.

(10) Patent No.: US 11,922,606 B2
(45) Date of Patent: Mar. 5, 2024

(54) MULTIPASS INTERFERENCE CORRECTION AND MATERIAL RECOGNITION BASED ON PATTERNED ILLUMINATION WITHOUT FRAME RATE LOSS

(71) Applicant: Samsung Electronics Co., Ltd., Suwon-si (KR)

(72) Inventors: Vladimir Mikhailovich Semenov, Malakhovka (RU); Anastasiia Sergeevna Suvorina, Moscow (RU); Vladislav Valer'evich Lychagov, Saratov (RU); Anton Sergeevich Medvedev, Korolev (RU); Evgeny Andreevich Dorokhov, Moscow (RU); Gennady Dmitrievich Mammykin, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 17/890,739

(22) Filed: Aug. 18, 2022

(65) Prior Publication Data

US 2023/0107489 A1 Apr. 6, 2023

Related U.S. Application Data

(63) Continuation of application No. PCT/KR2022/008617, filed on Jun. 17, 2022.

(30) Foreign Application Priority Data

Oct. 4, 2021 (RU) ............................ RU2021128894

(51) Int. Cl.
*G06T 5/00* (2006.01)
*G02B 5/20* (2006.01)
(Continued)

(52) U.S. Cl.
CPC ............. *G06T 5/006* (2013.01); *G02B 5/201* (2013.01); *G06T 5/50* (2013.01); *G06T 7/521* (2017.01);
(Continued)

(58) Field of Classification Search
CPC .......... G06T 5/006; G06T 5/50; G06T 7/521; G06T 2207/20081; G06T 2207/30168;
(Continued)

(56) References Cited

U.S. PATENT DOCUMENTS 8,611,610 B2 12/2013 Park et al.
9,405,008 B2 8/2016 Raskar et al.
(Continued)

FOREIGN PATENT DOCUMENTS

CN 106772430 A 5/2017
CN 106772430 B 5/2017
(Continued)

OTHER PUBLICATIONS

International Search Report dated Sep. 21, 2022, issued in International Patent Application No. PCT/KR2022/008617.
(Continued)

*Primary Examiner* — Timothy J Henn
(74) *Attorney, Agent, or Firm* — Jefferson IP Law, LLP

(57) ABSTRACT

The method includes simultaneously illuminating a scene by at least two light sources, each light source emitting structured light having a spatial pattern, a wavelength and/or a polarization, wherein the spatial pattern, the wavelength and/or the polarization of each structured light differ from each other, respectively, capturing an image of the scene simultaneously illuminated by the at least two light sources by an imaging sensor through a filter array, wherein one pixel of the imaging sensor captures the image through one filter of the filter array, calculating, for each pixel, intensity
(Continued)

values of direct and global components of the light received by the pixel from a system of equations compiled for each joint pixel, and performing, for each pixel, image correction by assigning to each pixel its calculated intensity value of the direct component to obtain a corrected image.

20 Claims, 15 Drawing Sheets

(51) Int. Cl.
- G06T 5/50 (2006.01)
- G06T 7/521 (2017.01)
- G06V 10/70 (2022.01)
- H04N 23/56 (2023.01)
- H04N 23/71 (2023.01)
- H04N 23/74 (2023.01)

(52) U.S. Cl.
CPC .......... *G06V 10/70* (2022.01); *H04N 23/56* (2023.01); *H04N 23/71* (2023.01); *H04N 23/74* (2023.01); *G06T 2207/20081* (2013.01); *G06T 2207/30168* (2013.01)

(58) Field of Classification Search
CPC .......... G06T 5/008; G06T 2207/10152; G06T 2207/20084; G02B 5/201; G06V 10/70; G06V 10/60; H04N 23/56; H04N 23/71; H04N 23/74; H04N 23/81; H04N 23/951
See application file for complete search history.

(56) References Cited

U.S. PATENT DOCUMENTS

| | | | |
|---|---|---|---|
| 9,729,860 B2 * | 8/2017 | Cohen | G01S 17/894 |
| 9,841,496 B2 | 12/2017 | Hudman | |
| 9,857,167 B2 * | 1/2018 | Jovanovski | G01B 11/2518 |
| 9,866,816 B2 | 1/2018 | Retterath | |
| 9,874,638 B2 | 1/2018 | Dorrington et al. | |
| 9,989,630 B2 | 6/2018 | Gruenwald | |
| 10,067,239 B2 | 9/2018 | Nelson et al. | |
| 10,168,144 B2 | 1/2019 | Lin | |
| 10,234,561 B2 * | 3/2019 | Godbaz | H04N 13/122 |
| 10,356,392 B2 | 7/2019 | Riza | |
| 10,430,956 B2 | 10/2019 | Lee et al. | |
| 10,445,893 B2 | 10/2019 | Bleyer et al. | |
| 10,739,463 B2 | 8/2020 | Koppal et al. | |
| 10,810,753 B2 | 10/2020 | Bleyer et al. | |
| 10,873,738 B2 | 12/2020 | Retterath | |
| 10,976,753 B2 | 4/2021 | Zhao et al. | |
| 11,187,804 B2 | 11/2021 | Lindner et al. | |
| 11,763,472 B1 * | 9/2023 | Alnahhas | G01S 17/36 382/154 |
| 2012/0033045 A1 | 2/2012 | Schweizer et al. | |
| 2014/0340569 A1 * | 11/2014 | Raskar | G01S 17/894 348/370 |
| 2015/0253429 A1 * | 9/2015 | Dorrington | G01S 7/4815 356/5.01 |
| 2016/0334509 A1 | 11/2016 | Gruenwald | |
| 2017/0123067 A1 | 5/2017 | Van Der Tempel | |
| 2018/0033146 A1 | 2/2018 | Bleyer et al. | |
| 2018/0253856 A1 * | 9/2018 | Price | G06F 3/012 |
| 2018/0341008 A1 | 11/2018 | Ortiz Egea | |
| 2019/0219696 A1 | 7/2019 | Xu | |
| 2020/0240774 A1 | 7/2020 | Kim et al. | |
| 2020/0368616 A1 | 11/2020 | Delamont | |
| 2020/0386540 A1 * | 12/2020 | Hseih | G01S 7/4915 |
| 2021/0231812 A1 | 7/2021 | Gil-Cacho | |
| 2021/0314467 A1 * | 10/2021 | Kramer | G03B 17/54 |
| 2023/0175840 A1 * | 6/2023 | Ito | G01B 11/2513 382/100 |

FOREIGN PATENT DOCUMENTS

| | | | | |
|---|---|---|---|---|
| CN | 107003391 A | | 8/2017 | |
| CN | 107295236 A | | 10/2017 | |
| CN | 108351649 A | | 7/2018 | |
| CN | 109313345 A | | 2/2019 | |
| CN | 210128694 U | | 3/2020 | |
| CN | 111189417 A | * | 5/2020 | ......... G01B 11/2441 |
| CN | 111966223 A | | 11/2020 | |
| CN | 112066906 A | | 12/2020 | |
| CN | 112204420 A | | 1/2021 | |
| CN | 112255639 A | | 1/2021 | |
| CN | 112507799 A | | 3/2021 | |
| EP | 3 508 814 A1 | | 7/2019 | |
| GB | 2579689 A | | 7/2020 | |
| RU | 2 400 815 C2 | | 4/2008 | |
| RU | 2 707 066 C1 | | 11/2019 | |
| TW | 202130973 A | * | 8/2021 | ............... G01C 3/06 |
| WO | 2013/015117 A1 | | 1/2013 | |
| WO | 2017/015473 A1 | | 1/2017 | |
| WO | 2017/151561 A1 | | 9/2017 | |
| WO | 2018/156821 A1 | | 8/2018 | |
| WO | 2018/224847 A2 | | 12/2018 | |
| WO | WO-2020184028 A1 * | | 9/2020 | ............. G01S 17/46 |

OTHER PUBLICATIONS

Jimenez et al., https://doi.org/10.1016/j.imavis.2013.10.008, Modeling and correction of multipath interference in time of flight cameras.

Russian Decision to grant dated Jul. 20, 2022, issued in Russian Patent Application No. 2021128894.

Russian Search Report dated Jul. 18, 2022, issued in Russian Patent Application No. 2021128894/28.

* cited by examiner

REFERENCE IMAGE

CORRECTED IMAGE OF SCENE
COMPRISING MIRROR

MULTIPASS INTERFERENCE CORRECTION AND MATERIAL RECOGNITION BASED ON PATTERNED ILLUMINATION WITHOUT FRAME RATE LOSS

CROSS-REFERENCE TO RELATED APPLICATION(S)

This application is a continuation application of International Application No. PCT/KR2022/008617, filed on Jun. 17, 2022, which is based on and claims the benefit of a Russian patent application number 2021128894, filed on Oct. 4, 2021, in the Russian Intellectual Property Office, the disclosure of which is incorporated by reference herein in its entirety.

BACKGROUND

Field

The disclosure relates to the field of processing two-dimensional (2D) and three-dimensional (3D) images. More particularly, the disclosure relates to a method for correcting multipass interference in an image, a method for determining a position of a mirror and a distance to the mirror, a method for recognizing object materials of a captured scene and devices for implementation of them.

Description of Related Art

The existence of multiple light propagation paths, including those emitted by a camera, is the cause of multipass interference (MPI). These light propagation paths have different optical path lengths and are formed due to multiple scattering and/or reflection of light on real objects in a scene. MPI results in loss of depth determination accuracy for 3D images and a shape distortion of captured objects in 2D and 3D images, with 3D images being more susceptible to the shape distortion of the objects due to MPI.

The MPI effect depends on the captured scene geometry, the shape and materials of the scene objects, which makes universal image correction for eliminating MPI (MPI correction) extremely complex. The incorrect shape of the displayed scene objects leads to poor object matching in augmented reality (AR), poor quality of object recognition, and poor quality of gesture recognition. Almost all known solutions for this problem require capturing a number of images (frames) to obtain a corrected image (frame) and lead to unwanted motion artifacts in the captured images. Other solutions require complex computations and cannot be performed in real time or provide insufficient MPI correction quality.

Depth sensing of a 3D image using time-of-flight (ToF) measurements or indirect time-of-flight (i-ToF) measurements is the dominant technology in 3D vision as it provides a low cost and robust solution for 3D scene reconstruction that is required for augmented reality (AR)/virtual reality (VR) and robotics applications. The major drawback of this technology is the shape distortion and loss of accuracy in determining the depth of the formed images due to MPI.

The MPI effect causes large errors (more than 10%) in determining the depth and limits the accuracy of conventional ToF or i-ToF sensors, the intrinsic depth error of which is ~0.5%. Low accuracy of depth determination results in low accuracy of simultaneous localization and mapping (SLAM) and degrades the navigation performance of a robot.

In addition, conventional ToF or i-ToF cameras do not detect mirrors and therefore, cannot correctly determine the depth of the scene in a mirror area. This results in incorrect SLAM/navigation data of the robot, inability to detect a mirror obstacle, and poor object matching in AR in the mirror area.

Reduction of frame rate caused by the need to capture a number of frames to obtain a corrected frame leads to a motion artifact in the captured image and an increase in processing time. The motion artifacts result in poor image quality, poor quality gesture recognition, poor recognition of moving objects, and poor object matching in AR.

Cameras usually include a multi-lens optical system. Multiple internal reflections arising inside the optical system lead to blurring of object boundaries and an appearance of scattering artifacts such as doubling, tripping, etc. of images (ghosting). A phantom object appears in a 2D or 3D image that does not actually exist. This type of errors critically affects 2D or 3D image quality and depth data when capturing 3D scenes with close objects. Such artifacts result in poor image quality, poor quality gesture recognition, poor quality face recognition, poor quality recognition of close objects, corrupted SLAM/navigation data, and poor object matching in AR.

Conventional imaging sensors, including ToF or i-ToF sensors, having a 2-tap pixel architecture do not eliminate the influence of background illumination caused by ambient light on the image data. To compensate these effects, a more complex sensor architecture is required, such as a 4-tap pixel architecture. This increases the pixel size and complexity of the electronics, which finally reduces a number of pixels per an area unit and increases the cost of the camera.

In the prior art, technical solutions are known for providing the MPI correction.

A patent application US 20190219696 A1 published on 15 Jan. 2018 and titled as «TIME OF FLIGHT CAMERA» provides a ToF camera and a method of determining distances to features in a scene comprising transmitting structured light modulated at a modulation frequency to illuminate the scene with a structured illumination pattern and for each combination of a sampling phase offset and a perturbation phase shift, modulating sensitivity of a photo sensor at the frequency of modulation of the transmitted light. This technical solution is difficult to implement and requires significant modification of the ToF camera.

A patent U.S. Pat. No. 9,989,630 B2 issued on 5 Jun. 2018 and titled as «STRUCTURED-LIGHT BASED MULTIPATH CANCELLATION IN TOF IMAGING» provides devices and techniques providing multipath interference cancelling for imaging devices and systems. In various implementations, structured light is used to diminish, if not cancel interference. For example, the light may be structured with respect to amplitude or phase, based on an emission angle of the light. This technical solution requires capturing several frames to obtain a corrected frame, which reduces a frame rate, increases a processing time and can lead to motion artifacts in a captured 3D image.

A patent U.S. Pat. No. 9,874,638 B2 issued on 23 Jan. 2018 and titled as «TIME OF FLIGHT CAMERA SYSTEM WHICH RESOLVES DIRECT AND MULTI-PATH RADIATION COMPONENTS» provides a ToF camera system that resolves the direct path component or the multi-path component of modulated radiation reflected from a target. The camera system includes a ToF transmitter arranged to transmit modulated radiation at a target, and at least one pattern application structure operating between the transmitter and the target. The ToF camera is arranged to resolve from the measurements received the contribution of direct source reflection radiation reflected from the target. This technical solution requires capturing several frames to obtain a corrected frame, which reduces a frame rate, increases a processing time and can lead to motion artifacts in a captured 3D image.

A patent U.S. Pat. No. 9,405,008 B2 issued on 2 Aug. 2016 and titled as «METHODS AND APPARATUS FOR MULTI-FREQUENCY CAMERA» provides a multi-frequency ToF camera that mitigates the effect of multi-path interference (MPI), and can calculate an accurate depth map despite MPI. A light source in the multi-frequency camera emits light in a temporal sequence of different frequencies (at least 4 frequencies). At each frequency, a lock-in sensor within the ToF camera captures 4 frames. From these 4 frames, one or more processors compute, for each pixel in the sensor, a single complex number. The processors stack all of such complex quantities (one such complex number per pixel per frequency) and solve for the depth and intensity, using a spectral estimation technique. This technical solution is difficult to implement and requires significant modification of the ToF camera. In addition, this technical solution requires capturing several frames to obtain a corrected frame, which reduces a frame rate, increases a processing time and can lead to motion artifacts in a captured 3D image.

A patent U.S. Pat. No. 10,234,561 B2 issued on 19 Mar. 2019 and titled as «SPECULAR REFLECTION REMOVAL IN TIME-OF-FLIGHT CAMERA APPARATUS» provides a method for facilitating removal of specular reflection noise from light data that can include illuminating, using an illumination unit, a target with a light source. The illumination unit is configured to project light with a spatial light pattern onto the target. The light data may comprise a directly reflected spatial light pattern and a specular reflected spatial light pattern. The directly reflected spatial light pattern and the specular reflected spatial light pattern comprise at least one spatial distinction that distinguishes the directly reflected spatial light pattern from the specular reflected spatial light pattern. This technical solution has complex post-processing and low correction accuracy.

The above information is provided as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for correcting multipass interference in an image, a method for determining a position of a mirror and a distance to the mirror, a method for recognizing object materials of a captured scene and devices for implementation of them, which provide accurate display of the object shape and improved accuracy of determining the depth in the 3D image. These advantages are achieved by at least one of:
- multipass interference correction, including multiple reflections of light from real objects and multiple internal reflections within the optical system of an imaging device,
- absence of frame rate reduction causing motion artifacts,
- ability to detect mirrors and correct a depth of a 3D image of a scene containing mirrors.

The disclosure allows to perform operations with low computational costs in real time by using simple computations.

The above advantages provide real-time operations, improved image quality, improved object matching in augmented reality (AR) devices, increased accuracy of simultaneous localization and mapping (SLAM), and therefore, improved robot navigation, The disclosure can use conventional imaging sensors with minor modifications in an imaging device, which simplifies the manufacture of the imaging device.

The disclosure allows for performing a background illumination correction with a conventional imaging sensor having 2-tap pixel structure with the same quality as an imaging sensor having 4-tap pixel structure. The 2-tap pixel structure, compared to the 4-tap pixel structure, allows to provide the sensor with higher resolution and smaller pixel size, and more efficiently use wafers due to the simple pixel structure. In addition, the 2-tap pixel structure provides faster modulation and higher frame rates, which reduces the number and quantity of motion artifacts.

Another aspect of the disclosure is to provide material recognition of objects in a captured scene using MPI correction results. The use of material recognition allows to implement functions such as sorting objects, for example, for cleaning by a robot, choosing the mode of interaction with an object, etc. These functions are relevant to both robotics and AR devices.

Another aspect of the disclosure is to provide a universal MPI correction method that can be applied to any real scene. The disclosure requires minimal, simple equipment modifications for conventional imaging devices and does not reduce the frame rate of an imaging sensor and provides high correction efficiency without complex computations.

Additional aspects will be set forth in part in the description which follows and, in part, will be apparent from the description, or may be learned by practice of the presented embodiments.

In accordance with an aspect of the disclosure, a method for correcting multipass interference in an image is provided. The method includes illuminating a scene by at least two light sources, each light source of the at least two light sources emitting structured light having at least one of a spatial pattern, a wavelength and/or a polarization, wherein the at least one of the spatial pattern, the wavelength and/or the polarization of each structured light differ from each other, respectively, capturing an image of the scene simultaneously illuminated by the at least two light sources by an imaging sensor through a filter array, wherein one pixel of the imaging sensor captures the image through one filter of the filter array, wherein the filter array comprises filter sets, a number of the filter sets corresponds to a number of the at least two light sources, one filter set transmits light of only a corresponding one light source of the at least two light sources, sides of each filter of the filter set are adjacent to sides of filters of different filter sets other than the filter set, and wherein adjacent pixels capturing the image through different filters form a joint pixel, a number of pixels of which is at least equal to the number of the at least two light sources, calculating, for each pixel, intensity values of direct and global components of the light received by the pixel from a system of equations.

$$\begin{cases} I_1 = b_1 \times I_d + c_1 \times I_g \\ \quad \vdots \\ I_n = b_n \times I_d + c_n \times I_g \end{cases}$$

wherein the system of equations is compiled for each joint pixel, and each equation is compiled for one pixel of the pixels in the joint pixel, 1 . . . n is a number of the light source and the pixel receiving the light from the light source, $I_x$ is a total intensity of the light received by a pixel x, $b_x \times I_d$ is the intensity value of the direct component of the light received by the pixel x, $c_x \times I_g$ is the intensity value of the global component of the light received by the pixel x, $b_x$ is a constant calculated in advance when calibrating the imaging sensor with capturing an image of a scene in which light reflection more than one time is absent according to formula $$b_x = \frac{I_{d_x}}{I_{d_1}},$$

$I_{d_x}$ is the intensity value of the direct component of the light incident on the pixel x when calibrating, $c_x$ is a constant calculated in advance according to formula $$c_x = \frac{P_x}{P_1},$$

$P_x$ is a power of the light source, x=1 . . . n, and wherein the direct component is a component of the light reflected one time from the scene object, and the global component is a component of the light reflected more than one time from the scene object, and performing for each pixel, image correction by assigning to each pixel its calculated intensity value of the direct component to obtain a corrected image.

In an additional aspect, adjacent joint pixels includes at least one pixel that is included in both adjacent joint pixels.

In another additional aspect, the method further includes revealing pixels on the corrected image, in which the image has a quality lower than a predetermined threshold value, and assigning to each of the revealed pixels the intensity value of the direct component calculated using at least one other pixel, in which the image has the quality equal to or greater than the predetermined threshold value.

In yet another additional aspect, an assigned intensity value of the direct component is an intensity value of the direct component of an adjacent pixel calculated on the calculating of the intensity values of direct and global components, in which the image has the quality equal to or greater than the predetermined threshold value.

In yet another additional aspect, an assigned intensity value of the direct component is an average intensity value of a direct component of adjacent pixels calculated on the calculating of the intensity values of direct and global components, in which the image has the quality equal to or greater than the predetermined threshold value.

In yet another additional aspect, an assigned intensity value of the direct component is an intensity value of a direct component calculated by approximating the intensity values of the direct component calculated on the calculating of the intensity values of the direct and global components for pixels in a for pixels in the vicinity of the pixel to which the intensity value of the direct component is assigned.

In yet another additional aspect, an assigned intensity value of the direct component is an intensity value of a direct component calculated by replacing, in the equation of each revealed pixel, a value $c_x \times I_g$ specifying the intensity value of the global component with a specifying the intensity value of the global component of other pixel, in which the image has the quality equal to or greater than the predetermined threshold value.

In yet another additional aspect, the method further includes revealing pixels on the corrected image, in which the image has the quality lower than a predetermined threshold value, changing the spatial pattern of a structured light of at least one light source, capturing an image of the scene simultaneously illuminated by the at least two light sources, calculating, for each pixel, an intensity value of direct component of the light from the system of equations, wherein the value $c_x \times I_g$ specifying the intensity value of the global component in each of the revealed pixels is replaced with the value specifying the intensity value of the global component of reward pixel selected from at least two previous images, in which the images have a highest quality.

In yet another additional aspect, the method further includes revealing pixels on the corrected image, in which the image has the quality lower than a predetermined threshold value, changing the spatial pattern of a structured light of at least one light source, capturing an image of the scene simultaneously illuminated by the at least two light sources, and calculating, for each pixel, an intensity value of direct component of the light from the system of equations, wherein the value $c_x \times I_g$ specifying the intensity value of the global component in each of the revealed pixels is replaced with an average value specifying the intensity value of the global component of a reward pixel from at least two previous corrected images, in which the images have a highest quality.

In yet another additional aspect, the method further incudes revealing pixels, on which the direct component of light does not incident based on the spatial patterns emitted by the light sources, or pixels, where a difference of constants $b_x$ does not exceed a predetermined threshold value, changing the spatial pattern of the structured light of at least one light source, capturing an image of the scene simultaneously illuminated by the at least two light sources, calculating, for each pixel, an intensity value of direct component of the light from the system of equations, wherein the value $c_x \times I_g$ specifying the intensity value of the global component in each of the revealed pixels is replaced with the value specifying the intensity value of the global component of reward pixel selected from at least two previous corrected images, in which the images have a highest quality.

In accordance with another aspect of the disclosure, a method for determining a position of a mirror and a distance to the mirror is provided. The method includes simultaneously illuminating a scene by at least two light sources, each light source of the at least two light sources emitting structured light having one of a spatial pattern, a wavelength and/or a polarization, wherein the at least one of the spatial pattern, the wavelength and/or the polarization of each structured light differ from each other, respectively, capturing an image of the scene simultaneously illuminated by the at least two light sources by an imaging sensor through a filter array, wherein one pixel of the imaging sensor captures the image through one filter of the filter array, wherein the filter array includes filter sets, a number of the filter sets corresponds to a number of the at least two light sources, one filter set transmits light of only the corresponding one light source of the at least two light sources, sides of each filter of the filter set are adjacent to sides of filters of different filter sets other than the filter set, and wherein adjacent pixels capturing the image through different filters form a joint pixel, a number of pixels of which is at least equal to the number of the at least two light sources, calculating, for each pixel, intensity values of direct and global components of the light received by the pixel from a system of equations $$\begin{cases} I_1 = b_1 \times I_d + c_1 \times I_g \\ \vdots \\ I_n = b_n \times I_d + c_n \times I_g \end{cases}$$

wherein the system of equations is compiled for each joint pixel, and each equation is compiled for one pixel of the pixels in the joint pixel, 1 . . . n is a number of the light source and the pixel receiving the light from the light source, $I_x$ is a total intensity of the light received by a pixel x, $b_x \times I_d$ is the intensity value of the direct component of the light received by the pixel x, $c_x \times I_g$ is the intensity value of the global component of the light received by the pixel x, $b_x$ is a constant calculated in advance when calibrating the imaging sensor with capturing an image of a scene in which light reflection more than one time is absent according to formula $$b_x = \frac{I_{d_x}}{I_{d_1}},$$

$I_{d_x}$ is the intensity value of the direct component of the light incident on the pixel x when calibrating, $c_x$ is a constant calculated in advance according to formula $$c_x = \frac{P_x}{P_1},$$

$P_x$ is a power of the light source, x=1 . . . n, and wherein the direct component is the component of the light reflected one time from a scene object, and the global component is the component of the light reflected more than one time from the scene object, performing for each pixel, image correction by assigning to each pixel its calculated intensity value of the direct component to obtain a corrected image, determining a presence of the mirror in the scene based on an image distortion area in the corrected image by comparing the corrected image with a reference image, the reference image being formed in advance when capturing a scene in which light reflection more than one time is absent and illuminated with light having the same spatial patterns as in the corrected image, and determining the position of the mirror and the distance to the mirror with respect to the imaging sensor by processing the corrected image in which the presence of the mirror is determined by a trained artificial intelligence tool, the trained artificial intelligence tool being trained using a plurality of training images of a scene comprising a mirror from different viewpoints and different positioning of the mirror with indicating the position of the mirror and the distance to the mirror.

In an additional aspect, adjacent joint pixels includes at least one pixel that is included in both adjacent joint pixels.

In another additional aspect, the method further includes revealing pixels on the corrected image, in which the image has a quality lower than a predetermined threshold value, and assigning to each of the revealed pixels the intensity value of the direct component calculated using at least one other pixel, in which the image has the quality equal to or greater than the predetermined threshold value.

In yet another additional aspect, an assigned intensity value of the direct component is an intensity value of a direct component of adjacent pixel calculated on the calculating of the intensity values of the direct and global components, in which the image has the quality equal to or greater than the predetermined threshold value.

In yet another additional aspect, an assigned intensity value of the direct component is an average intensity value of a direct component of adjacent pixels calculated on the calculating of the intensity values of the direct and global components, in which the image has the quality equal to or greater than the predetermined threshold value.

In yet another additional aspect, an assigned intensity value of the direct component is an intensity value of a direct component calculated by approximating the intensity values of the direct component calculated on the calculating of the intensity values of the direct and global components for pixels in avicinity of the pixel to which the intensity value of the direct component is assigned.

In yet another additional aspect, an assigned intensity value of the direct component is an intensity value of a direct component calculated by replacing, in the equation of each revealed pixel, a value $c_x \times I_g$ specifying the intensity value of the global component with a value specifying the intensity value of the global component of other pixel, in which the image has the quality equal to or greater than the predetermined threshold value.

In yet another additional aspect, the method further includes revealing pixels on the corrected image, in which the image has a quality lower than the predetermined threshold value, changing the spatial pattern of a structured light of at least one light source, capturing an image of the scene simultaneously illuminated by the at least two light sources, and calculating, for each pixel, an intensity value of direct component of the light from the system of equations, wherein the value $c_x \times I_g$ specifying the intensity value of the global component in each of the revealed pixels is replaced with the value specifying the intensity value of the global component of a reward pixel selected from at least two previous images, in which the images have a highest quality.

In yet another additional aspect, the method further includes revealing pixels on the corrected image, in which the image has a quality lower the predetermined threshold value, changing the spatial pattern of a structured light of at least one light source, capturing an image of the scene simultaneously illuminated by the at least two light sources, and calculating, for each pixel, an intensity value of direct component of the light from the system of equations, wherein the value $c_x \times I_g$ specifying the intensity value of the global component in each of the revealed pixels is replaced with an average value specifying the intensity value of the global component of a reward pixel from at least two previous corrected images, in which the images have a highest quality.

In yet another additional aspect, the method further includes revealing pixels, on which the direct component of light does not incident based on the spatial patterns emitted by the at least two light sources, or pixels, where a difference of constants $b_x$ does not exceed a predetermined threshold value, changing a spatial pattern of the structured light of at least one light source, capturing an image of the scene simultaneously illuminated by the at least two light sources, calculating, for each pixel, an intensity value of direct component of the light from the system of equations, wherein the value $c_x \times I_g$ specifying the intensity value of the global component in each of the revealed pixels is replaced with the value specifying the intensity value of the global component of a reward pixel selected from at least two previous corrected images, and in which the images have a highest quality.

In accordance with another aspect of the disclosure, a method for recognizing object materials of a captured scene is provided. The method includes simultaneously illuminating a scene by at least two light sources, each light source emitting structured light having one of a spatial pattern, a wavelength and/or a polarization, wherein the at least one of spatial pattern, the wavelength and/or the polarization of each structured light differ from each other, respectively, capturing an image of the scene simultaneously illuminated by the at least two light sources by an imaging sensor through a filter array, wherein one pixel of the imaging sensor captures the image through one filter of the filter array, wherein the filter array includes filter sets, a number of the filter sets corresponds to a number of the at least two light sources, one filter set transmits light of only a corresponding one light source of the at least two light sources, sides of each filter of the filter set are adjacent to sides of filters of different filter sets other than the filter set, and wherein adjacent pixels capturing the image through different filters form a joint pixel, a number of pixels of which is at least equal to the number of the at least two light sources, calculating, for each pixel, intensity values of direct and global components of the light received by the pixel from a system of equations.

$$\begin{cases} I_1 = b_1 \times I_d + c_1 \times I_g \\ \quad \cdot \\ \quad \cdot \\ \quad \cdot \\ I_n = b_n \times I_d + c_n \times I_g \end{cases}$$

wherein the system of equations is compiled for each joint pixel, and each equation is compiled for one pixel of the pixels in the joint pixel, 1 . . . n is a number of the light source and the pixel receiving the light from the light source, $I_x$ is a total intensity of the light received by the pixel x, $b_x \times I_d$ is the intensity value of the direct component of the light received by the pixel x, $c_x \times I_g$ is the intensity value of the global component of the light received by a pixel x, $b_x$ is a constant calculated in advance when calibrating the imaging sensor with capturing an image of a scene in which light reflection more than one time is absent according to formula $$b_x = \frac{I_{d_x}}{I_{d_1}},$$

$I_{d_x}$ is the intensity value of the direct component of the light incident on the pixel x when calibrating, $c_x$ is a constant calculated in advance according to formula $$c_x = \frac{P_x}{P_1},$$

$P_x$ is a power of the light source, x=1 . . . . n, and wherein the direct component is the component of the light reflected one time from a scene object, and the global component is the component of the light reflected more than one time from the scene object, performing for each pixel, image correction by assigning to each pixel its calculated intensity value of the direct component to obtain a corrected image, and recognizing the object materials of the captured scene by processing the corrected image by a trained artificial intelligence tool, the trained artificial intelligence tool being trained using a plurality of training images of objects from different materials and information on a material of an object in a training image of the plurality of training images of objects.

In an additional aspect, adjacent joint pixels includes at least one pixel that is included in both adjacent joint pixels.

In another additional aspect, the method further includes revealing pixels on the corrected image, in which the image has a quality lower than a predetermined threshold value, and assigning to each of the revealed pixels the intensity value of the direct component calculated using at least one other pixel, in which the image has the quality equal to or greater than the predetermined threshold value.

In yet another additional aspect, assigned intensity value of the direct component is an intensity value of the direct component of adjacent pixel calculated on the operation, in which the image has the quality equal to or greater than the predetermined threshold value.

In yet another additional aspect, an assigned intensity value of the direct component is an average intensity value of a direct component of adjacent pixels calculated on the calculating of the intensity values of the direct and global components, in which the image has the quality equal to or greater than the predetermined threshold value.

In yet another additional aspect, an assigned intensity value of the direct component is an intensity value of a direct component calculated by approximating the intensity values of the direct component calculated on the calculating of the intensity values of the direct and global components for pixels in the vicinity of the pixel to which the intensity value of the direct component is assigned.

In yet another additional aspect, an assigned intensity value of the direct component is an intensity value of a direct component calculated by replacing, in the equation of each revealed pixel, a value $c_x \times I_g$ specifying the intensity value of the global component with a value specifying the intensity value of the global component of other pixel, in which the image has the quality equal to or greater than the predetermined threshold value.

In yet another additional aspect, the method further includes revealing pixels on the corrected image, in which the image has a quality lower than a predetermined threshold value, changing the spatial pattern of a structured light of at least one light source, capturing an image of the scene simultaneously illuminated by the at least two light sources, and calculating, for each pixel, an intensity value of direct component of the light from the system of equations, wherein the value $c_x \times I_g$ specifying the intensity value of the global component in each of the revealed pixels is replaced with a value specifying the intensity value of the global component of a reward pixel selected from at least two previous images, in which the images have a highest quality.

In yet another additional aspect, the method further includes pixels on the corrected image, in which the image has a quality lower than a predetermined threshold value, changing the spatial pattern of a structured light of at least one light source, capturing an image of the scene simultaneously illuminated by the at least two light sources, and calculating, for each pixel, an intensity value of direct component of the light from the system of equations, wherein the value $c_x \times I_g$ specifying the intensity value of the global component in each of the revealed pixels is replaced with an average value specifying the intensity value of the global component of a reward pixel from at least two previous corrected images, in which the images have a highest quality.

In yet another additional aspect, the method further includes revealing pixels, on which the direct component of light does not incident based on the spatial patterns emitted by the at least two light sources, or pixels, where a difference of constants $b_x$ does not exceed a predetermined threshold value, changing the spatial pattern of a structured light of at least one light source, capturing an image of the scene simultaneously illuminated by the at least two light sources, and calculating, for each pixel, an intensity value of direct component of the light from the system of equations, wherein the value $c_x \times I_g$ specifying the intensity value of the global component in each of the revealed pixels is replaced with the value specifying the intensity value of the global component of a reward pixel selected from at least two previous corrected images, in which the images have a highest quality.

In yet another additional aspect, the plurality of training images of objects include pairs of the corrected image of the object and the captured image of the object, and information on the material of the object in the training image is information indicating the material of the object in each pair of the images.

In yet another additional aspect, the plurality of training images of objects are corrected images of different objects, and information on the material of the object in the training image is the bidirectional reflectance distribution function of the object in each training image.

In accordance with another aspect of the disclosure, an electronic computing device is provided. The electronic computing device includes at least two light sources for simultaneously illuminating a scene, each light source of the at least two light sources emitting structured light having one of a spatial pattern, a wavelength and/or a polarization, wherein the at least one of the spatial pattern, the wavelength and/or the polarization of each structured light differ from each other, respectively, an imaging sensor, a filter array, wherein one pixel of the imaging sensor captures an image through one filter of the filter array, wherein the filter array includes filter sets, a number of the at least two filter sets corresponds to a number of the light sources, one filter set transmits light of only a corresponding one light source of the at least two light sources, sides of each filter of the filter set are adjacent to sides of filters of different filter sets other than the filter set, and wherein adjacent pixels capturing the image through different filters form a joint pixel, a number of pixels of which is at least equal to the number of the at least two light sources, at least one processor, and a memory storing instructions that, when executed by the at least one processor, cause the at least one processor to perform embodiments of a method for correcting multipass interference in an image.

In accordance with another aspect of the disclosure, an electronic computing device is provided. The electronic computing device includes at least two light sources for simultaneously illuminating a scene, each light source of the at least two light sources emitting structured light having at least one of a spatial pattern, a wavelength and/or a polarization, wherein the at least one of the spatial pattern, the wavelength and/or the polarization of each structured light differ from each other, respectively, an imaging sensor, a filter array, wherein one pixel of the imaging sensor captures an image through one filter of the filter array, wherein the filter array includes filter sets, a number of the at least two filter sets corresponds to a number of the light sources, one filter set transmits light of only a corresponding one light source of the at least two light sources, sides of each filter of the filter set are adjacent to sides of filters of different filter sets other than the filter set, and wherein adjacent pixels capturing the image through different filters form a joint pixel, a number of pixels of which is at least equal to the number of the at least two light sources, at least one processor, and a memory storing numerical parameters of a trained artificial intelligence tool and instructions that, when executed by the at least one processor, cause the at least one processor to perform embodiments of a method for determining a position of a mirror and a distance to the mirror.

In accordance with another aspect of the disclosure, an electronic computing device is provided. The electronic computing device includes at least two light sources for simultaneously illuminating a scene, each light source of the at least two light sources emitting structured light having at least one of a spatial pattern, a wavelength and/or a polarization, wherein the at least one of the spatial pattern, the wavelength and/or the polarization of each structured light differ from each other, respectively, an imaging sensor, a filter array, wherein one pixel of the imaging sensor captures an image through one filter of the filter array, wherein the filter array includes filter sets, a number of the at least two filter sets corresponds to a number of the light sources, one filter set transmits light of only a corresponding one light source of the at least two light sources, sides of each filter of the filter set are adjacent to sides of filters of different filter sets other than the filter set, and wherein adjacent pixels capturing the image through different filters form a joint pixel, a number of pixels of which is at least equal to the number of the at least two light sources, at least one processor, and a memory storing numerical parameters of a trained artificial intelligence tool and instructions that, when executed by the at least one processor, cause the at least one processor to perform embodiments of a method for recognizing object materials of a captured scene.

In yet another additional aspect, the plurality of training images of objects are corrected images of different objects.

In yet another additional aspect, the information on the material of the object in the training image is a bidirectional reflectance distribution function (BRDF) of the object in the training image for each training image of the plurality of training images.

In yet another additional aspect, reflectancies of different materials differ from each other, such that the BRDF specifies a particular material of the scene object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying by drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Additionally, it should be understood that the terms "comprises", "comprising", "includes" and/or "including", when used in this application, mean the presence of the stated features, values, operations, elements and/or components, but do not exclude the presence or addition of one or more other features, values, operations, elements, components, and/or their groups.

Figure 1:
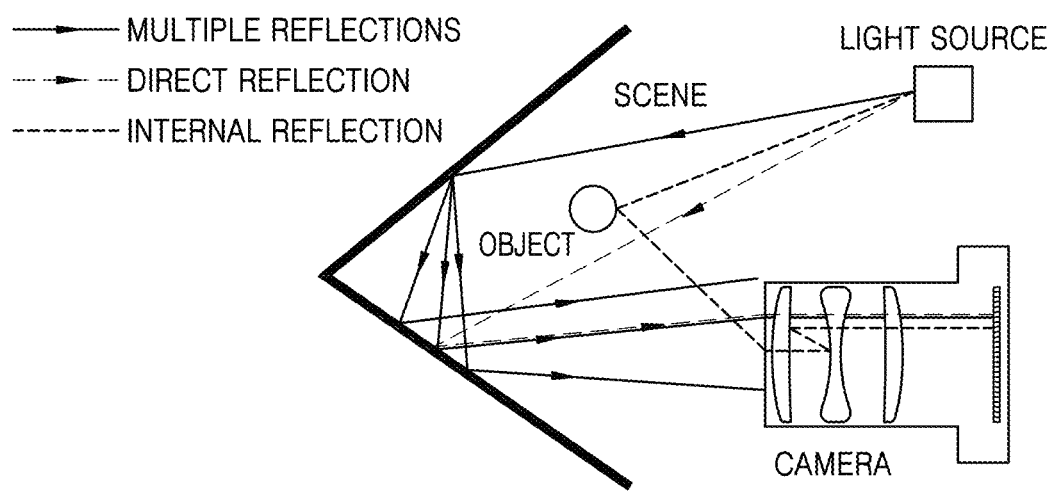
FIG. 1 schematically illustrates a propagation of light in image capturing according to an embodiment of the disclosure.

FIG. 1 schematically illustrates the propagation of light in image capturing according to an embodiment of the disclosure. Light reflected from objects of the scene one time (direct reflection) and light reflected from objects of the scene more than one time (multiple reflections) incident on the imaging sensor.

Referring to FIG. 1, the light reflected one time is shown by a dashed line, and the light reflected more than one time is shown by a solid line. In addition, a camera may include a multi-lens optical system in which internal reflections of light from elements of the optical system may occur that are depicted by a dotted line.

Entire light incident on each pixel of the imaging sensor is composed of a direct component and a global component. The direct component is the component of the light reflected from the object of the scene one time, and the global component is the component of the light reflected from the object of the scene more than one time. The multiple reflections that introduce a global component, cause the MPI effect and result in shape distortion of the captured objects in 2D and 3D images and loss of accuracy in determining a depth for 3D images. Internal reflections arising inside the optical system of the camera also introduce the global component and result in blurring of boundaries of the objects and the appearance of scattering artifacts, such as ghosting.

In order to avoid the occurrence of the above artifacts in the image, the disclosure proposes to eliminate the global component from the light incident on the imaging sensor.

Figure 2:
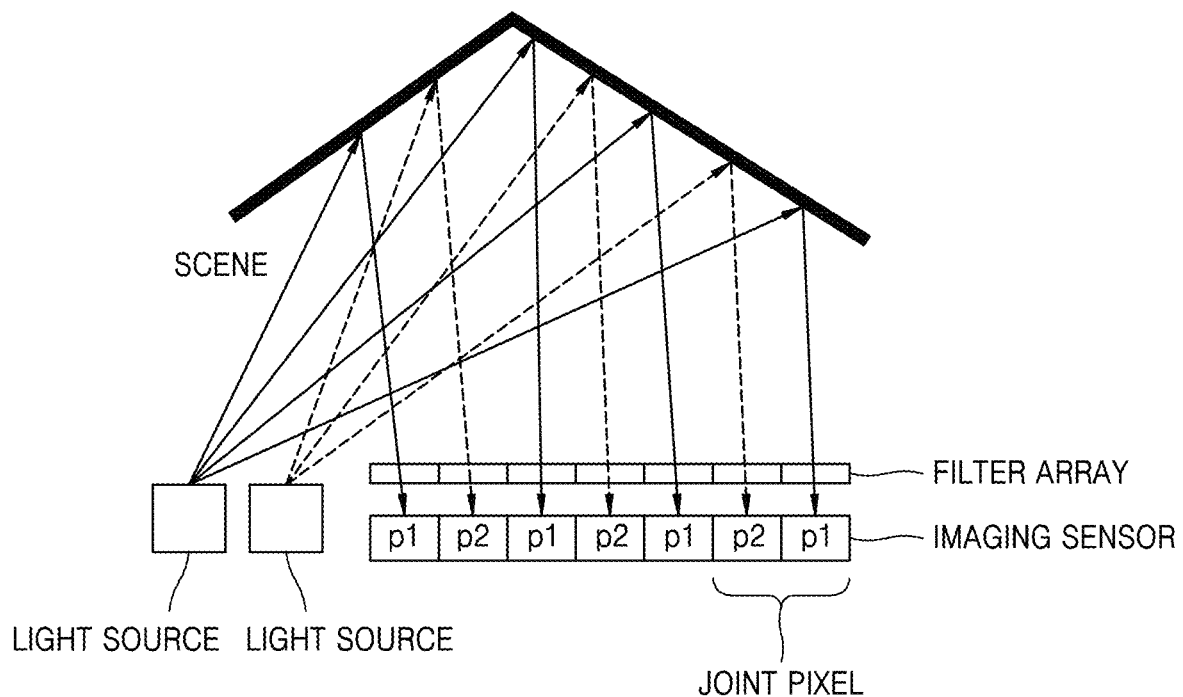
FIG. 2 schematically illustrates an image capturing process according to an embodiment of the disclosure.

FIG. 2 schematically illustrates an image capturing device and an image capturing process according to an embodiment of the disclosure. The image capturing device according to the disclosure comprises the imaging sensor, a filter array, and at least two light sources.

Referring to FIG. 2, only two light sources are shown, however, the disclosure is not limited thereto and any number of light sources can be used. Each light source emits structured light having a spatial pattern, wavelength and/or polarization. The spatial pattern, wavelength and/or polarization of the structured light of ach light source differ from each other, respectively. The spatial patterns can be, for example, horizontal and/or vertical lines, a matrix of dots, arbitrary arranged dots, etc. and their combination. The disclosure is not limited to these examples of the spatial pattern, and it can be anything. The generation of structured light is known in the prior art and, therefore, its description will be omitted.

The number of filters in the filter array is equal to the number of pixels in the imaging sensor, and one filter is located over one pixel. The filter array consists of filter sets. The number of the filter sets corresponds to the number of the light sources. One filter set only transmits light of the corresponding one light source. The filters from different filter sets are arranged in interleaved manner so that sides of each filter from the filter set are adjacent to sides of filters from another filter set(s).

Adjacent pixels capturing the image through different filters form a joint pixel. The number of pixels of the adjacent pixel is at least equal to the number of the light sources.

FIGS. 3A, 3B, 3C, and 3D schematically illustrate embodiments of joint pixels according to various embodiments of the disclosure.

Figure 3A:
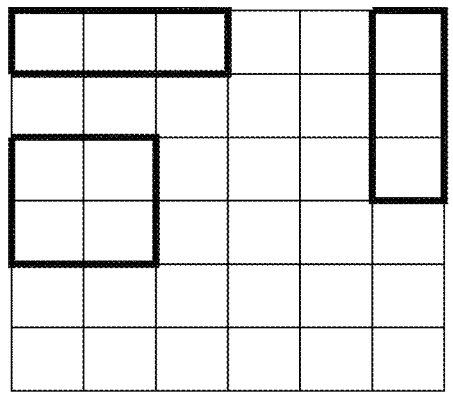
FIGS. 3A, 3B, 3C, and 3D schematically illustrate embodiments of joint pixels according to various embodiments of the disclosure.

Referring to FIG. 3A, various embodiments of joint pixel are depicted by the bold line. The joint pixel can be composed of horizontally arranged pixels, vertically arranged pixels, or an N×M matrix of pixels, where N and M are integers.

The entire pixel array of the imaging sensor is divided into joint pixels. The joint pixels can be arranged either adjacent to each other or in overlapped manner.

Figure 3B:
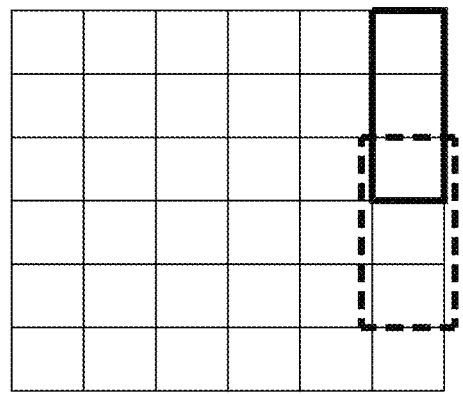
Figure 3C:
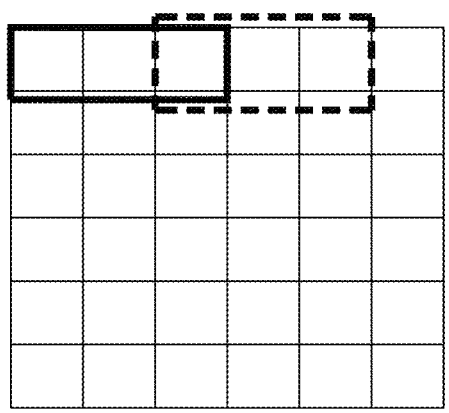
Figure 3D:
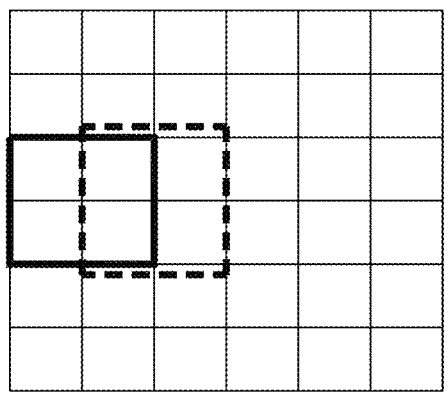

Referring to FIGS. 3B, 3C, and 3D embodiments of overlapping adjacent joint pixels are shown. In case of overlapping, adjacent joint pixels comprise at least one pixel included in both adjacent joint pixels.

It should be understood that the shape of the joint pixels, the number of pixels in the joint pixel, and the amount of overlapping of adjacent joint pixels are not limited to the examples shown in FIGS. 3A, 3B, 3C, and 3D, and may be anything.

Figure 4A:
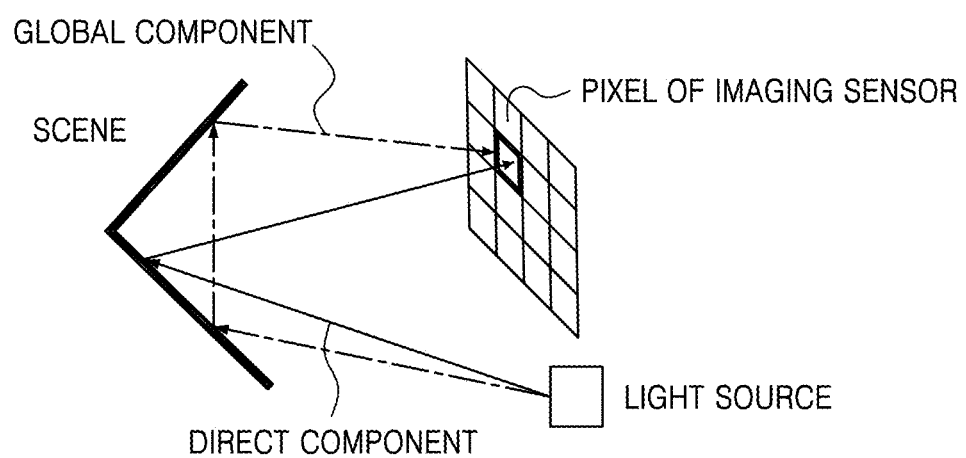
FIGS. 4A and 4B schematically illustrate direct and global components of light and their intensities according to various embodiments of the disclosure.
Figure 4B:
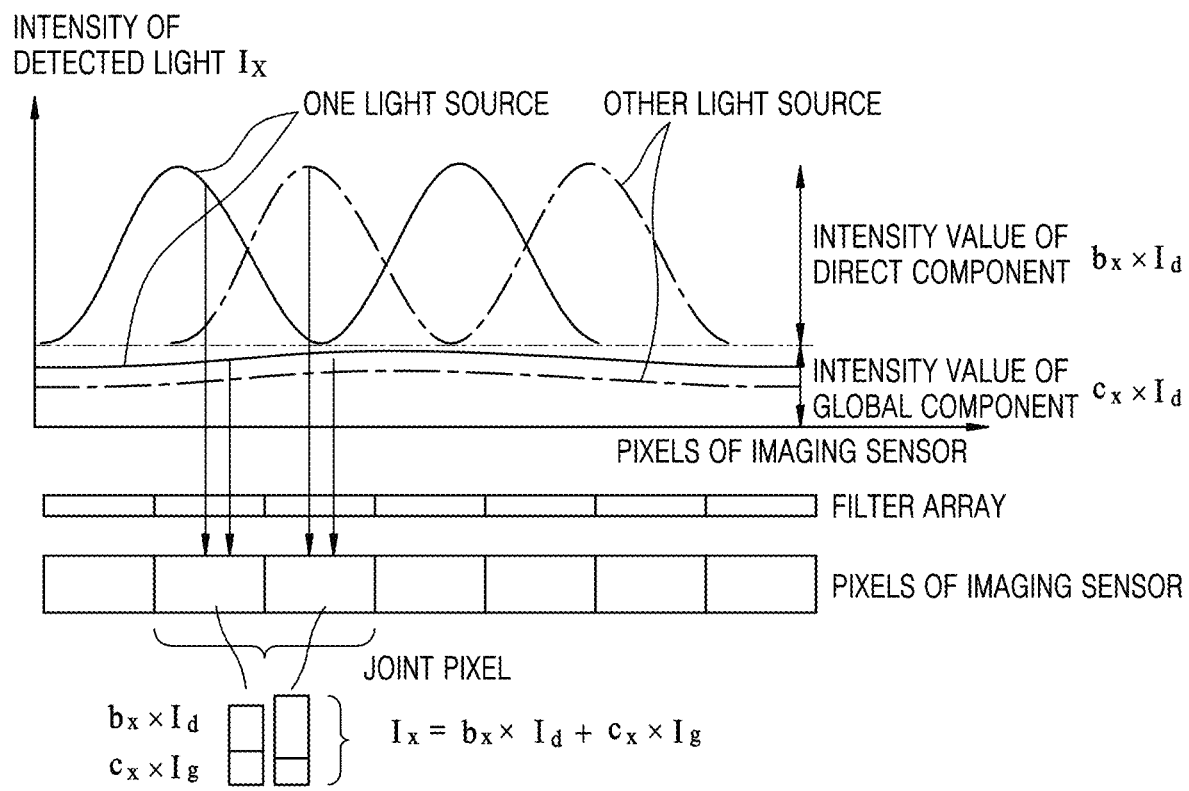

FIGS. 4A and 4B schematically illustrate direct and global components of light and their intensities according to various embodiments of the disclosure.

Referring to FIG. 4A, the optical paths of the direct and global components of light incident on one pixel of the imaging sensor from the light source is schematically shown. The path of the direct component is shown as a solid line and represents one reflection from the object of the scene. The path of the global component is shown as a dash-and-dot line and represents more than one reflection from objects of the scene.

Referring to FIG. 4B, a graph of the distribution of the intensity of light incident on the pixels of the imaging sensor from different light sources. Total intensity $I_x$ of light detected by the pixel x is equal to a sum of an intensity value $b_x \times I_d$ of the direct component and an intensity value $c_x \times I_g$ of the global component. On each pixel, light incidents with different values of the intensity of the direct component and the intensity of the global component. The value of total intensity $I_x$ of light incident on the pixel x detected by the pixel x and is known. The intensity value $b_x \times I_d$ of the direct component and the intensity value $c_x \times I_g$ of the global component are not known. To perform the MPI correction according to the disclosure it is required to exclude the intensity value $c_x \times I_g$ of the global component from the total intensity $I_x$ of light, i.e. to keep only the intensity value $b_x \times I_d$ of the direct component as the intensity value of a pixel in formed image.

The intensity value $b_x \times I_d$ of the direct component and the intensity value $c_x \times I_g$ of the global component can be calculated from a system of equations composed for each joint pixel. Each system of equations comprises equations of intensities $I_x = b_x \times I_d + c_x \times I_g$ for each pixel x in joint pixel, where x is a number of pixel, $b_x$ is a constant calculated in advance when calibrating the imaging sensor according to a formula $$b_x = \frac{I_{d_x}}{I_{d_1}},$$

x=1 . . . n, $c_x$ is a constant calculated in advance according to formula $$c_x = \frac{P_1}{P_x},$$

$P_x$ is a power or me light source, x=1 . . . n. The calibration is performed by capturing an image of a scene in which light reflection more than one time is absent. Such scene can be, for example, a flat, even surface such as a wall. However, the disclosure is not limited to this example, the scene for calibrating the imaging sensor can be any scene in which light reflection more than one time is absent. The solution of the systems of equations allows to calculate the intensity value $b_x \times I_d$ of the direct component for each pixel of the imaging sensor as the intensity value of the pixel of the formed image.

Hereinafter, various embodiments of the disclosure are described in more detail with reference to the accompanying drawings.

A method 100 for correcting multipass interference in an image can be performed by an electronic computing device 400 that can be, for example, video and/or photo camera, smartphone, mobile phone, virtual and/or augmented reality device, robot etc.

Figure 9:
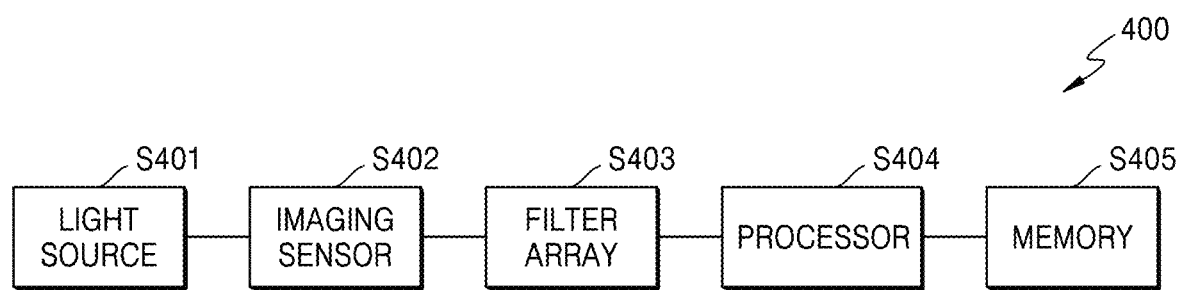
FIG. 9 is a block diagram of a mobile device for performing the method for correcting multipass interference in an image according to an embodiment of the disclosure.

FIG. 9 is a block diagram of a mobile device for performing the method for correcting multipass interference in an image according to an embodiment of the disclosure.

Referring to FIG. 9, a block diagram of the electronic computing device 400 is depicted on FIG. 9. The electronic computing device 400 comprises at least two light source 401, an imaging sensor 402, a filter array 403, at least one processor 404, and a memory 405.

The at least two light source 401 are configured to simultaneously illuminate a scene. Each light source 401 emits structured light having a spatial pattern, wavelength and/or polarization. The spatial pattern, wavelength and/or polarization of each structured light differ from each other, respectively.

The imaging sensor 402 can be any known imaging sensor such as a complementary metal-oxide semiconductor (CMOS) sensor, a charge coupled device (CCD) sensor each having a 2-tap pixel architecture or a 4-tap pixel architecture.

As described above with reference to FIG. 2, the filter array 403 is arranged in front of the imaging sensor 402. One pixel of the imaging sensor 402 captures the image through one filter of the filter array 403. Filter array 403 contains filter sets. The number of filter sets corresponds to the number of light sources 401. One filter set only transmits light of only one corresponding light source 401. Sides of each filter of the filter set are adjacent to the sides of filters of different filter set(s) other than the filter set. Adjacent pixels capturing the image through different filters form a joint pixel, a number of pixels of which is at least equal to the number of the light sources 401.

One or more processors 404 may include a general purpose processor, such as a central processing unit (CPU), an application processor (AP), a graphics processing unit (GPU), a visual processing unit (VPU), or the like, and/or an AI-dedicated processor such as a neural processing unit (NPU). One or more processors perform data processing in accordance with an operating rule defined by instructions stored in the memory 405. The memory 405 can be non-volatile memory or volatile memory. The memory 405 stores instructions that, when executed by at least one processor 404, allow to execute method 100.

Figure 6:
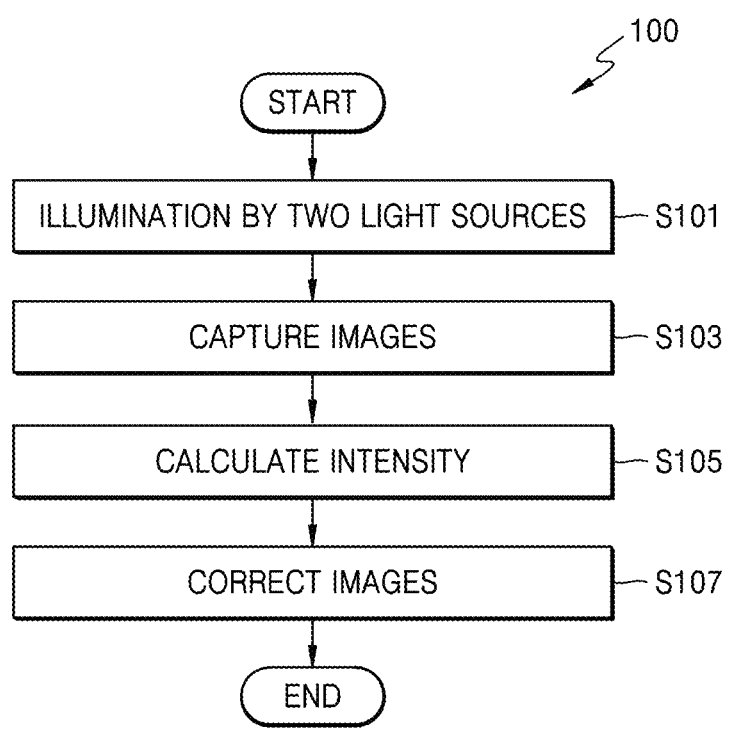
FIG. 6 is a flowchart of a method for correcting multipass interference in an image according to an embodiment of the disclosure.

FIG. 6 illustrates a flowchart of the method 100 for correcting multipass interference in an image according to an embodiment of the disclosure. The method 100 for correcting multipass interference in an image comprises the following operations.

On an operation S101, a scene is simultaneously illuminated by at least two light sources 401. Each light source 401 emits structured light having a spatial pattern, wavelength and/or polarization. The spatial pattern, wavelength and/or polarization of each structured light differ from each other, respectively.

On an operation S103, an image of the scene simultaneously illuminated by the at least two light sources 401 is captured by an imaging sensor 402 through a filter array 403. As described above with reference to FIG. 2, one pixel of the imaging sensor 402 captures the image through one filter of the filter array 403. The filter array 403 comprises filter sets, a number of the filter sets corresponds to a number of the light sources 401. One filter set transmits light of only the one corresponding light source 401. Sides of each filter of the filter set are adjacent to the sides of filters of different filter set(s) other than the filter set. Adjacent pixels capturing the image through different filters form a joint pixel, a number of pixels of which is at least equal to the number of the light sources 401.

On an operation S105, for each pixel, intensity values of direct and global components of the light received by the pixel are calculated from a system of equations:

$$\begin{cases} I_1 = b_1 \times I_d + c_1 \times I_g \\ \quad \vdots \\ I_n = b_n \times I_d + c_n \times I_g \end{cases}$$

The system of equations is compiled for each joint pixel, and each equation, in the system of equations, is compiled for one pixel of the pixels in the joint pixel. 1 . . . n is a number of the light source 401 and the pixel receiving the light from the light source 401. $I_x$ is a total intensity of the light received by the pixel x. $b_x \times I_d$ is the intensity value of the direct component of the light received by the pixel x. $c_x \times I_g$ is the intensity value of the global component of the light received by the pixel x. $b_x$ is a constant calculated in advance when calibrating the imaging sensor with capturing an image of a scene in which light reflection more than one time is absent according to formula $$b_x = \frac{I_{d_x}}{I_{d_1}}.$$

$I_{d_x}$ is the intensity value of the direct component of the light incident on the pixel x when calibrating. $c_x$ is a constant calculated in advance according to formula $$c_x = \frac{P_x}{P_1}.$$

$P_x$ is a power of the light source, x=1 . . . n. The direct component is the component of the light reflected one time from the scene object, and the global component is the component of the light reflected more than one time from the scene object.

On an operation S107, image correction is performed, for each pixel, by assigning to each pixel its calculated intensity value of the direct component to obtain a corrected image.

In the method 100, adjacent joint pixels can comprise at least one pixel that is included in both adjacent joint pixels. Examples of the joint pixels have been described above with reference to FIGS. 3A, 3B, 3C, and 3D.

The method 100 can further comprise: revealing pixels on the corrected image, in which the image has a quality lower a predetermined threshold value; and assigning to each of revealed pixels the intensity value of the direct component calculated using at least one other pixel, in which the image has the quality equal to or greater than the predetermined threshold value. The threshold value of the image quality can be set based on, for example, the degree of image sharpness. However, the disclosure is not limited only to the fact that the threshold value is set based on the image sharpness, the threshold value can be set based on any image characteristic defining the image quality.

In the method 100, assigned intensity value of the direct component can be an intensity value of the direct component of adjacent pixel calculated on the operation S105, in which the image has the quality equal to or greater than the predetermined threshold value.

In the method 100, assigned intensity value of the direct component can be an average intensity value of the direct component of adjacent pixels calculated on the operation S105, in which the image has the quality equal to or greater than the predetermined threshold value.

In the method 100, assigned intensity value of the direct component can be an intensity value of the direct component calculated by approximating the intensity values of the direct component calculated on the operation S105 for pixels in the vicinity of the pixel to which the intensity value of the direct component is assigned.

In the method 100, assigned intensity value of the direct component can be an intensity value of the direct component calculated by replacing, in the equation of each revealed pixel, the value $c_x \times I_g$ specifying the intensity value of the global component with the value specifying the intensity value of the global component of other pixel, in which the image has the quality equal to or greater than the predetermined threshold value.

The method 100 can further comprise: revealing pixels on the corrected image, in which the image has the quality lower the predetermined threshold value; changing the spatial pattern of the structured light of at least one light source 401; capturing an image of the scene simultaneously illuminated by the at least two light sources 401; calculating, for each pixel, an intensity value of direct component of the light from the system of equations, wherein the value $c_x \times I_g$ specifying the intensity value of the global component in revealed pixel is replaced with the value specifying the intensity value of the global component of said pixel selected from at least two previous images, wherein selected value relates to a pixel, in which the image has highest quality.

The method 100 can further comprise: revealing pixels on the corrected image, in which the image has the quality lower the predetermined threshold value; changing the spatial pattern of the structured light of at least one light source 401; capturing an image of the scene simultaneously illuminated by the at least two light sources 401; calculating, for each pixel, an intensity value of direct component of the light from the system of equations, wherein the value $c_x \times I_g$ specifying the intensity value of the global component in revealed pixel is replaced with an average value specifying the intensity value of the global component of reward pixel from at least two previous corrected images.

The method 100 can further comprise: revealing pixels, on which the direct component of light does not incident based on the spatial patterns emitted by the light sources 401, or pixels, where a difference of constants $b_x$ does not exceed a predetermined threshold value; changing the spatial pattern of the structured light of at least one light source 401; capturing an image of the scene simultaneously illuminated by the at least two light sources 401; calculating, for each pixel, an intensity value of direct component of the light from the system of equations, wherein the value $c_x \times I_g$ specifying the intensity value of the global component in revealed pixel is replaced with the value specifying the intensity value of the global component of reward pixel selected from at least two previous corrected images, wherein selected value relates to a pixel, in which the image has highest quality.

Figure 10:
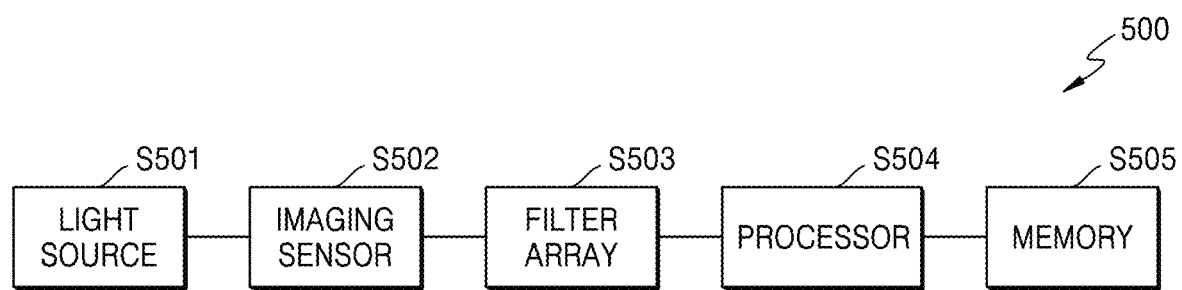
FIG. 10 is a block diagram of a mobile device for performing a method for determining a position of a mirror and a distance to the mirror according to an embodiment of the disclosure.

FIG. 10 is a block diagram of a mobile device for performing the method for determining a position of a mirror and a distance to the mirror according to an embodiment of the disclosure.

Referring to FIG. 10, a method 200 of FIG. 6 for determining a position of a mirror and a distance to the mirror can be performed by an electronic computing device 500 that can be, for example, video and/or photo camera, smartphone, mobile phone, virtual and/or augmented reality device, robot etc.

The electronic computing device 500 comprises at least two light source 501, an imaging sensor 502, a filter array 503, at least one processor 504, and a memory 505.

The at least two light source 501 are configured to simultaneously illuminate a scene. Each light source 501 emits structured light having a spatial pattern, wavelength and/or polarization. The spatial pattern, wavelength and/or polarization of each structured light differ from each other, respectively.

The imaging sensor 502 can be any known imaging sensor such as a CMOS sensor, a CCD sensor each having a 2-tap pixel architecture or a 4-tap pixel architecture.

As described above with reference to FIG. 2, the filter array 503 is arranged in front of the imaging sensor 502. One pixel of the imaging sensor 502 captures the image through one filter of the filter array 503. Filter array 503 contains filter sets. The number of filter sets corresponds to the number of light sources 501. One filter set only transmits light of only one corresponding light source 501. Sides of each filter of the filter set are adjacent to the sides of filters of different filter set(s) other than the filter set. Adjacent pixels capturing the image through different filters form a joint pixel, a number of pixels of which is at least equal to the number of the light sources 501.

The electronic computing device 500 may include one or more modules for performing operations of the method. At least one of the plurality of modules may be implemented as artificial intelligence (AI) tool. A function associated with the AI may be performed through the non-volatile memory, the volatile memory, and the processor.

One or more processors 504 may include a general purpose processor, such as a central processing unit (CPU), an application processor (AP), a graphics processing unit (GPU), a visual processing unit (VPU), or the like, and/or an AI-dedicated processor such as a neural processing unit (NPU).

One or more processors 504 control the processing of the input data in accordance with a predefined operating rule or artificial intelligence (AI) tool stored in the non-volatile memory and the volatile memory. The predefined operating rule or artificial intelligence tool is provided through training.

Being provided through learning means that, by applying a learning algorithm to a plurality of learning data, a predefined operating rule or AI tool of a desired characteristic is made. The learning may be performed in a device itself that comprises the trained AI tool according to an embodiment is performed, and/o may be implemented through a separate server/system.

The artificial intelligence tool may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device using a plurality of learning data to cause, allow, or control the target device to make a determination or prediction. Examples of learning algorithms include, but are not limited to, supervised learning, unsupervised learning, semi-supervised learning, or reinforcement learning.

One or more processors perform data processing in accordance with an operating rule defined by instructions stored in the memory 505. The memory 505 can be nonvolatile memory or volatile memory. The memory 505 stores numeric parameters of the trained artificial intelligence tool and instructions that, when executed by at least one processor 504, allow to execute method 200.

Figure 7:
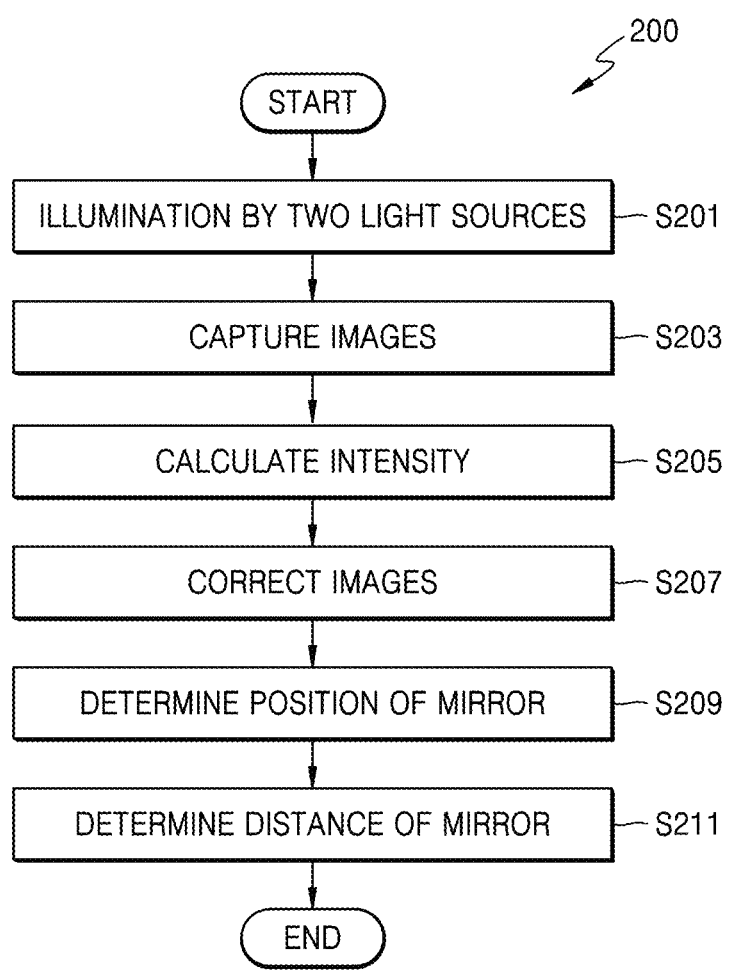
FIG. 7 is a flowchart of a method for determining a position of a mirror and a distance to the mirror according to an embodiment of the disclosure.

FIG. 7 illustrates a flowchart of the method 200 for determining a position of a mirror and a distance to the mirror according to an embodiment of the disclosure. The method 200 for determining a position of a mirror and a distance to the mirror comprises the following operations.

Referring to FIG. 7, operations S201, S203, S205, S207 of the method 200 completely corresponds to the operations S101, S103, S105, S107 of the method 100, therefore, their description is omitted.

On an operation S209, the presence of the mirror in the scene is determined based on an image distortion area in the corrected image by comparing the corrected image with a reference image. The reference image is formed in advance when capturing a scene in which light reflection more than one time is absent and illuminated with light having the same spatial patterns as in the corrected image.

Figure 5:
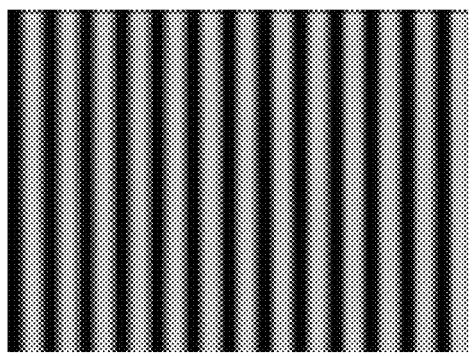
FIG. 5 illustrates an example of a reference image and a corrected image of a scene comprising a mirror for determining a presence of the mirror in the scene according to an embodiment of the disclosure.
Figure 5:
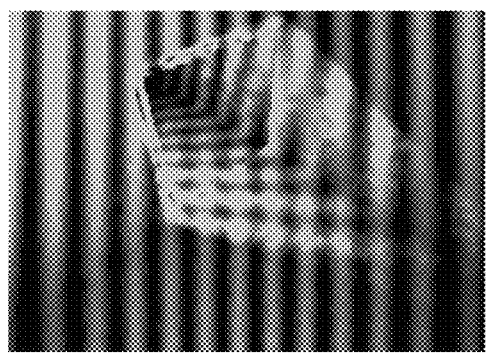

FIG. 5 illustrates an example of reference image and the corrected image of the scene comprising the mirror according to an embodiment of the disclosure. It should be understood that the disclosure is not limited to the spatial pattern shown in FIG. 5, and the spatial pattern may be any, such as horizontal and/or vertical lines, a matrix of dots, arbitrary arranged dots, etc. and their combination. As shown in FIG. 5, the spatial pattern is distorted in the corrected image of the scene comprising the mirror. This distortion of the spatial pattern indicates the presence of the mirror in the captured scene.

On an operation S211, the position of the mirror and the distance to the mirror with respect to the imaging sensor are determined by processing the corrected image in which the presence of the mirror is determined by a trained artificial intelligence tool. The artificial intelligence tool is trained using a plurality of training images of a scene comprising a mirror from different viewpoints and different positioning of the mirror with indicating a position of the mirror and a distance to the mirror on the training images.

In the method 200, adjacent joint pixels can comprise at least one pixel that is included in both adjacent joint pixels. Examples of the joint pixels have been described above with reference to FIGS. 3A, 3B, 3C and 3D.

The method 200 can further comprise: revealing pixels on the corrected image, in which the image has a quality lower a predetermined threshold value; and assigning to each of revealed pixels the intensity value of the direct component calculated using at least one other pixel, in which the image has the quality equal to or greater than the predetermined threshold value. The threshold value of the image quality can be set based on, for example, the degree of image sharpness. However, the disclosure is not limited only to the fact that the threshold value is set based on the image sharpness, the threshold value can be set based on any image characteristic defining the image quality.

In the method 200, assigned intensity value of the direct component can be an intensity value of the direct component of adjacent pixel calculated on the operation S205, in which the image has the quality equal to or greater than the predetermined threshold value.

In the method 200, assigned intensity value of the direct component can be an average intensity value of the direct component of adjacent pixels calculated on the operation S205, in which the image has the quality equal to or greater than the predetermined threshold value.

In the method 200, assigned intensity value of the direct component can be an intensity value of the direct component calculated by approximating the intensity values of the direct component calculated on the operation S205 for pixels in the vicinity of the pixel to which the intensity value of the direct component is assigned.

In the method 200, assigned intensity value of the direct component can be an intensity value of the direct component calculated by replacing, in the equation of each revealed pixel, the value $c_x \times I_g$ specifying the intensity value of the global component with the value specifying the intensity value of the global component of other pixel, in which the image has the quality equal to or greater than the predetermined threshold value.

The method 200 can further comprise: revealing pixels on the corrected image, in which the image has the quality lower the predetermined threshold value; changing the spatial pattern of the structured light of at least one light source 501; capturing an image of the scene simultaneously illuminated by the at least two light sources 501; calculating, for each pixel, an intensity value of direct component of the light from the system of equations, wherein the value $c_x \times I_g$ specifying the intensity value of the global component in revealed pixel is replaced with the value specifying the intensity value of the global component of reward pixel selected from at least two previous images, wherein selected value relates to a pixel, in which the image has highest quality.

The method 200 can further comprise: revealing pixels on the corrected image, in which the image has the quality lower the predetermined threshold value; changing the spatial pattern of the structured light of at least one light source 501; capturing an image of the scene simultaneously illuminated by the at least two light sources 501; calculating, for each pixel, an intensity value of direct component of the light from the system of equations, wherein the value $c_x \times I_g$ specifying the intensity value of the global component in revealed pixel is replaced with an average value specifying the intensity value of the global component of reward pixel from at least two previous corrected images.

The method 200 can further comprise: revealing pixels, on which the direct component of light does not incident based on the spatial patterns emitted by the light sources 501, or pixels, where a difference of constants $b_x$ does not exceed a predetermined threshold value; changing the spatial pattern of the structured light of at least one light source 501; capturing an image of the scene simultaneously illuminated by the at least two light sources 501; calculating, for each pixel, an intensity value of direct component of the light from the system of equations, wherein the value $c_x \times I_g$ specifying the intensity value of the global component in revealed pixel is replaced with the value specifying the intensity value of the global component of reward pixel selected from at least two previous corrected images, wherein selected value relates to a pixel, in which the image has highest quality.

Figure 11:
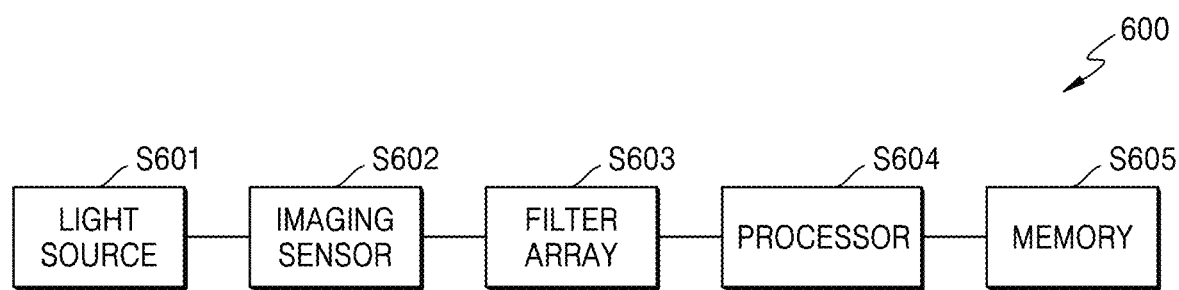
FIG. 11 is a block diagram of a mobile device for performing a method for recognizing object materials of a captured scene according to an embodiment of the disclosure.

FIG. 11 is a block diagram of a mobile device for performing the method for recognizing object materials of a captured scene according to an embodiment of the disclosure.

Referring to FIG. 11, a method 300 of FIG. 7 for recognizing object materials of a captured scene can be performed by an electronic computing device 600 that can be, for example, video and/or photo camera, smartphone, mobile phone, virtual and/or augmented reality device, robot etc. The electronic computing device 600 comprises at least two light source 601, an imaging sensor 602, a filter array 603, at least one processor 604, and a memory 605.

The at least two light source 601 are configured to simultaneously illuminate a scene. Each light source 601 emits structured light having a spatial pattern, wavelength and/or polarization. The spatial pattern, wavelength and/or polarization of each structured light differ from each other, respectively.

The imaging sensor 602 can be any known imaging sensor such as a CMOS sensor, a CCD sensor each having a 2-tap pixel architecture or a 4-tap pixel architecture.

As described above with reference to FIG. 2, the filter array 603 is arranged in front of the imaging sensor 602. One pixel of the imaging sensor 602 captures the image through one filter of the filter array 603. Filter array 603 contains filter sets. The number of filter sets corresponds to the number of light sources 601. One filter set only transmits light of only one corresponding light source 601. Sides of each filter of the filter set are adjacent to the sides of filters of different filter set(s) other than the filter set. Adjacent pixels capturing the image through different filters form a joint pixel, a number of pixels of which is at least equal to the number of the light sources 601.

The electronic computing device 600 may include one or more modules for performing operations of the method. At least one of the plurality of modules may be implemented as artificial intelligence (AI) tool. A function associated with the AI may be performed through the non-volatile memory, the volatile memory, and the processor.

One or more processors 604 may include a general purpose processor, such as a central processing unit (CPU), an application processor (AP), a graphics processing unit (GPU), a visual processing unit (VPU), or the like, and/or an AI-dedicated processor such as a neural processing unit (NPU).

One or more processors 604 control the processing of the input data in accordance with a predefined operating rule or an artificial intelligence (AI) tool stored in the non-volatile memory and the volatile memory. The predefined operating rule or the artificial intelligence tool is provided through training or learning.

Being provided through learning means that, by applying a learning algorithm to a plurality of learning data, a predefined operating rule or AI tool of a desired characteristic is made. The learning may be performed in a device itself that comprises the trained AI tool according to an embodiment is performed, and/o may be implemented through a separate server/system.

The artificial intelligence tool may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device using a plurality of learning data to cause, allow, or control the target device to make a determination or prediction. Examples of learning algorithms include, but are not limited to, supervised learning, unsupervised learning, semi-supervised learning, or reinforcement learning.

One or more processors perform data processing in accordance with an operating rule defined by instructions stored in the memory 605. The memory 605 can be nonvolatile memory or volatile memory. The memory 605 stores numeric parameters of the trained artificial intelligence tool and instructions that, when executed by at least one processor 604, allow to execute method 300.

Figure 8:
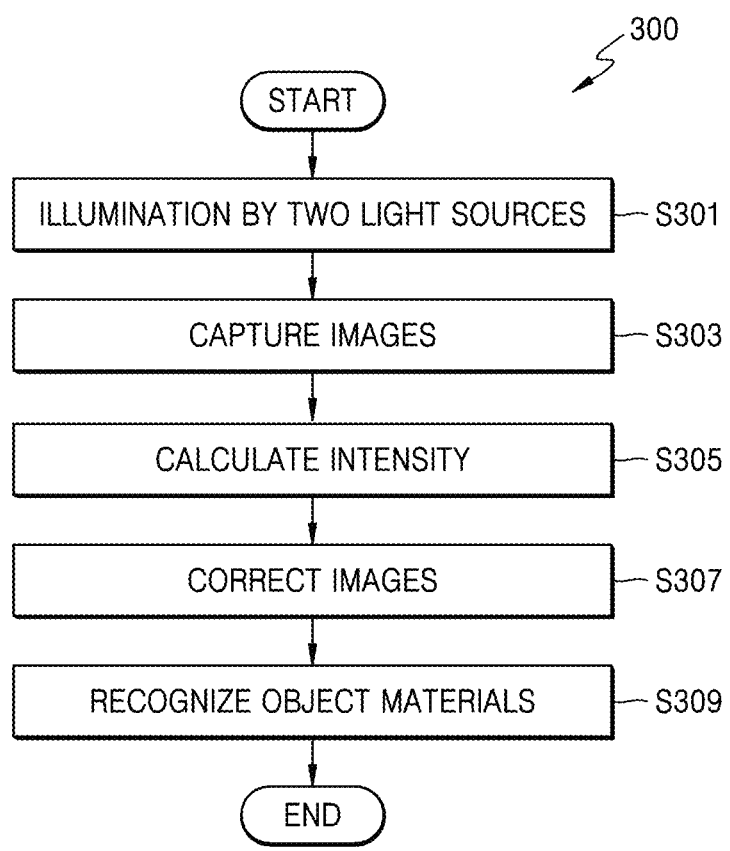
FIG. 8 is a flowchart of a method for recognizing object materials of a captured scene according to an embodiment of the disclosure.

FIG. 8 illustrates a flowchart of the method 300 for recognizing object materials of a captured scene according to an embodiment of the disclosure. The method 300 for recognizing object materials of a captured scene comprises the following operations.

Operations S301, S303, S305, S307 of the method 300 completely corresponds to the operation S101, S103, S105, S107 of the method 100, therefore, their description is omitted.

On an operation S309, the object materials of the captured scene are recognized by processing the corrected image by the trained artificial intelligence tool, the artificial intelligence tool being trained using a plurality of training images of objects from different materials and information on the material of the object in the training image.

In the method 300, adjacent joint pixels can comprise at least one pixel that is included in both adjacent joint pixels. Examples of the joint pixels have been described above with reference to FIGS. 3A, 3B, 3C, and 3D.

The method 300 can further comprise: revealing pixels on the corrected image, in which the image has a quality lower a predetermined threshold value; and assigning to each of revealed pixels the intensity value of the direct component calculated using at least one other pixel, in which the image has the quality equal to or greater than the predetermined threshold value. The threshold value of the image quality can be set based on, for example, the degree of image sharpness. However, the disclosure is not limited only to the fact that the threshold value is set based on the image sharpness, the threshold value can be set based on any image characteristic defining the image quality.

In the method 300, assigned intensity value of the direct component can be an intensity value of the direct component of adjacent pixel calculated on the operation S305, in which the image has the quality equal to or greater than the predetermined threshold value.

In the method 300, assigned intensity value of the direct component can be an average intensity value of the direct component of adjacent pixels calculated on the operation S305, in which the image has the quality equal to or greater than the predetermined threshold value.

In the method 300, assigned intensity value of the direct component can be an intensity value of the direct component calculated by approximating the intensity values of the direct component calculated on the operation S305 for pixels in the vicinity of the pixel to which the intensity value of the direct component is assigned.

In the method 300, assigned intensity value of the direct component can be an intensity value of the direct component calculated by replacing, in the equation of each revealed pixel, the value $c_x \times I_g$ specifying the intensity value of the global component with the value specifying the intensity value of the global component of other pixel, in which the image has the quality equal to or greater than the predetermined threshold value.

The method 300 can further comprise: revealing pixels on the corrected image, in which the image has the quality lower the predetermined threshold value; changing the spatial pattern of the structured light of at least one light source 601; capturing an image of the scene simultaneously illuminated by the at least two light sources 601; calculating, for each pixel, an intensity value of direct component of the light from the system of equations, wherein the value $c_x \times I_g$ specifying the intensity value of the global component in revealed pixel is replaced with the value specifying the intensity value of the global component of reward pixel selected from at least two previous images, wherein selected value relates to a pixel, in which the image has highest quality.

The method 300 can further comprise: revealing pixels on the corrected image, in which the image has the quality lower the predetermined threshold value; changing the spatial pattern of the structured light of at least one light source 601; capturing an image of the scene simultaneously illuminated by the at least two light sources 601; calculating, for each pixel, an intensity value of direct component of the light from the system of equations, wherein the value $c_x \times I_g$ specifying the intensity value of the global component in revealed pixel is replaced with an average value specifying the intensity value of the global component of reward pixel from at least two previous corrected images.

The method 300 can further comprise: revealing pixels, on which the direct component of light does not incident based on the spatial patterns emitted by the light sources 601, or pixels, where a difference of constants $b_x$ does not exceed a predetermined threshold value; changing the spatial pattern of the structured light of at least one light source 601; capturing an image of the scene simultaneously illuminated by the at least two light sources 601; calculating, for each pixel, an intensity value of direct component of the light from the system of equations, wherein the value $c_x \times I_g$ specifying the intensity value of the global component in revealed pixel is replaced with the value specifying the intensity value of the global component of reward pixel selected from at least two previous corrected images, wherein selected value relates to a pixel, in which the image has highest quality.

In the method 300, the training images of the objects can include pairs of the corrected image of the object and the captured image of the object, and information on the material of the object in the training image is information indicating the material of the object in each pair of the images.

In the method 300, the training images of the objects are corrected images of different objects, and information on the material of the object in the training image is the Bidirectional reflectance distribution function (BRDF) of the object in the training image for each training image. Reflectancies of different materials differ from each other, so BRDF specifies the particular material of the scene object.

In addition, the methods disclosed herein may be implemented on a computer-readable medium that stores numeric parameters of the trained artificial intelligence tool and computer-executable instructions that, when executed by a processor, cause the processor to perform any of disclosed. The trained artificial intelligence tool and instructions for implementing the methods can be downloaded to an electronic computing device via a network or from a medium.

The above descriptions of the embodiments are illustrative, and configuration modifications and implementations are within the scope of the description. For example, although the embodiments of the disclosure have been described in general in connection with FIGS. 1, 2, 3A to 3D, 4A, 4B, 5 to 11, the descriptions given are exemplary. Although the subject matter is described in a language characteristic of structural features or methodological operations, it is clear that the subject matter defined by the proposed claims is not necessarily limited by the specific features or operations described above. Moreover, the specific features and operations described above are disclosed as embodiments of the claims. The disclosure is not limited by disclosed order of the operation, the order can be modified by a skilled person without innovative innovations. Some or all of the operations of the method can be performed sequentially or in parallel.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for correcting an image of a scene with structured light, the method comprising:

simultaneously illuminating a scene by at least two light sources, each light source of the at least two light sources emitting structured light having at least one of a spatial pattern, a wavelength or a polarization, wherein the at least one of the spatial pattern, the wavelength or the polarization of each structured light differ from each other, respectively;

capturing an image of the scene simultaneously illuminated by the at least two light sources by an imaging sensor through a filter array, wherein one pixel of the imaging sensor captures the image through one filter of the filter array, wherein the filter array comprises filter sets, a number of the filter sets corresponds to a number of the at least two light sources, one filter set transmits light of only a corresponding one light source of the at least two light sources, sides of each filter of the filter set are adjacent to sides of filters of different filter sets other than the filter set, and wherein adjacent pixels capturing the image through different filters form a joint pixel, a number of pixels of which is at least equal to the number of the at least two light sources;

calculating, for each pixel, intensity values of direct and global components of the light received by the pixel from a system of equations:

$$\begin{cases} I_1 = b_1 \times I_d + c_1 \times I_g \\ \vdots \\ I_n = b_n \times I_d + c_n \times I_g \end{cases}$$

wherein the system of equations is compiled for each joint pixel, and each equation is compiled for one pixel of the pixels in the joint pixel, 1 ... n is a number of the light source and the pixel receiving the light from the light source, $I_x$ is a total intensity of the light received by a pixel x, $b_x \times I_d$ is the intensity value of the direct component of the light received by the pixel x, $c_x \times I_g$ is the intensity value of the global component of the light received by the pixel x, $b_x$ is a constant calculated in advance when calibrating the imaging sensor with capturing an image of a scene in which light reflection more than one time is absent according to formula $$b_x = \frac{I_{d_x}}{I_{d_1}},$$

$I_{d_x}$ is the intensity value of the direct component of the light incident on the pixel x when calibrating, $c_x$ is a constant calculated in advance according to formula $$c_x = \frac{P_x}{P_1},$$

$P_x$ is a power of the light source, x=1 ... n, and wherein the direct component is a component of the light reflected one time from a scene object, and the global component is the component of the light reflected more than one time from the scene object; and performing for each pixel, image correction by assigning to each pixel its calculated intensity value of the direct component to obtain a corrected image.

2. The method according to claim 1, wherein adjacent joint pixels comprise at least one pixel that is included in both adjacent joint pixels.

3. The method according to claim 2, further comprising:
revealing pixels on the corrected image, in which the image has a quality lower than a predetermined threshold value; and assigning to each of the revealed pixels the intensity value of the direct component calculated using at least one other pixel, in which the image has the quality equal to or greater than the predetermined threshold value.

4. The method according to claim 3, wherein an assigned intensity value of the direct component is an intensity value of the direct component of an adjacent pixel calculated on the calculating of the intensity values of direct and global components, in which the image has the quality equal to or greater than the predetermined threshold value.

5. The method according to claim 3, wherein an assigned intensity value of the direct component is an average intensity value of a direct component of adjacent pixels calculated on the calculating of the intensity values of direct and global components, in which the image has the quality equal to or greater than the predetermined threshold value.

6. The method according to claim 3, wherein an assigned intensity value of the direct component is an intensity value of a direct component calculated by approximating the intensity values of the direct component calculated on the calculating of the intensity values of the direct and global components for pixels in a vicinity of the pixel to which the intensity value of the direct component is assigned.

7. The method according to claim 3, wherein an assigned intensity value of the direct component is an intensity value of a direct component calculated by replacing, in the equation of each revealed pixel, a value $c_x \times I_g$ specifying the intensity value of the global component with a value specifying the intensity value of the global component of other pixel, in which the image has the quality equal to or greater than the predetermined threshold value.

8. The method according to claim 2, further comprising:
revealing pixels on the corrected image, in which the image has a quality lower than a predetermined threshold value;
changing the spatial pattern of a structured light of at least one light source;
capturing an image of the scene simultaneously illuminated by the at least two light sources; and
calculating, for each pixel, an intensity value of direct component of the light from the system of equations,
wherein the value $c_x \times I_g$ specifying the intensity value of the global component in each of the revealed pixels is replaced with a value specifying the intensity value of the global component of a reward pixel selected from at least two previous images in which the images have a highest quality.

9. The method according to claim 2, further comprising:
revealing pixels on the corrected image, in which the image has a quality lower then a predetermined threshold value;
changing the spatial pattern of a structured light of at least one light source;
capturing an image of the scene simultaneously illuminated by the at least two light sources; and
calculating, for each pixel, an intensity value of direct component of the light from the system of equations,
wherein the value $c_x \times I_g$ specifying the intensity value of the global component in each of the revealed pixels is replaced with an average value specifying the intensity value of the global component of a reward pixel from at least two previous corrected images, in which the images have a highest quality.

10. The method according to claim 2, further comprising:
revealing pixels, on which the direct component of light does not incident based on the spatial patterns emitted by the at least two light sources, or pixels, where a difference of constants $b_x$ does not exceed a predetermined threshold value;
changing the spatial pattern of a structured light of at least one light source;
capturing an image of the scene simultaneously illuminated by the at least two light sources; and
calculating, for each pixel, an intensity value of direct component of the light from the system of equations,
wherein the value $c_x \times I_g$ specifying the intensity value of the global component in each of the revealed pixels is replaced with a value specifying the intensity value of the global component of a reward pixel selected from at least two previous corrected images, in which the images have a highest quality.

11. The method according to claim 1, further comprising:
determining a presence of a mirror in the scene based on an image distortion area in the corrected image by comparing the corrected image with a reference image, the reference image being formed in advance when capturing a scene in which light reflection more than one time is absent and illuminated with light having the same spatial patterns as in the corrected image; and
determining a position of the mirror and a distance to the mirror with respect to the imaging sensor by processing the corrected image in which the presence of the mirror is determined by a trained artificial intelligence tool, the trained artificial intelligence tool being trained using a plurality of training images of a scene comprising a mirror from different viewpoints and different positioning of the mirror with indicating the position of the mirror and the distance to the mirror.

12. The method according to claim 1, further comprising:
recognizing object materials of the captured scene by processing the corrected image by a trained artificial intelligence tool, the trained artificial intelligence tool being trained using a plurality of training images of objects from different materials and information on a material of an object in a training image of the plurality of training images of objects.

13. The method according to claim 12, wherein the training images of the objects include pairs of the corrected image of the object and the captured image of the object, and information on the material of the object in the training image is information indicating the material of the object in each pair of the images.

14. The method according to claim 12, wherein the training images of the objects are corrected images of different objects, and information on the material of the object in the training image is the Bidirectional reflectance distribution function of the object in the training image for each training image.

15. An electronic computing device comprising:
at least two light sources for simultaneously illuminating a scene, each light source of the at least two light sources emitting structured light having at least one of a spatial pattern, a wavelength or a polarization, wherein the at least one of the spatial pattern, the wavelength or the polarization of each structured light differ from each other, respectively;
an imaging sensor;
a filter array,
wherein one pixel of the imaging sensor captures an image through one filter of the filter array,
wherein the filter array comprises filter sets, a number of the filter sets corresponds to a number of the at least two light sources, one filter set transmits light of only a corresponding one light source of the at least two light sources, sides of each filter of the filter set are adjacent to sides of filters of different filter sets other than the filter set, and
wherein adjacent pixels capturing the image through different filters form a joint pixel, a number of pixels of which is at least equal to the number of the at least two light sources;
at least one processor; and
a memory storing instructions that, when executed by the at least one processor, cause the at least one processor to perform a method for correcting an image of a scene with structured light, the method comprising:
simultaneously illuminating the scene by at least two light sources, each light source of the at least two light sources emitting structured light having at least one of a spatial pattern, a wavelength or a polarization, wherein the at least one of the spatial pattern, the wavelength or the polarization of each structured light differ from each other, respectively;

capturing an image of the scene simultaneously illuminated by the at least two light sources by an imaging sensor through a filter array, wherein one pixel of the imaging sensor captures the image through one filter of the filter array, wherein the filter array comprises filter sets, a number of the filter sets corresponds to a number of the at least two light sources, one filter set transmits light of only a corresponding one light source of the at least two light sources, sides of each filter of the filter set are adjacent to sides of filters of different filter sets other than the filter set, and wherein adjacent pixels capturing the image through different filters form a joint pixel, a number of pixels of which is at least equal to the number of the at least two light sources;

calculating, for each pixel, intensity values of direct and global components of the light received by the pixel from a system of equations:

$$\begin{cases} I_1 = b_1 \times I_d + c_1 \times I_g \\ \quad \cdot \\ \quad \cdot \\ \quad \cdot \\ I_n = b_n \times I_d + c_n \times I_g \end{cases}$$

wherein the system of equations is compiled for each joint pixel, and each equation is compiled for one pixel of the pixels in the joint pixel, 1 . . . n is a number of the light source and the pixel receiving the light from the light source, $I_x$ is a total intensity of the light received by a pixel x, $b_x \times I_d$ is the intensity value of the direct component of the light received by the pixel x, $c_x \times I_g$ is the intensity value of the global component of the light received by the pixel x, $b_x$ is a constant calculated in advance when calibrating the imaging sensor with capturing an image of a scene in which light reflection more than one time is absent according to formula $$b_x = \frac{I_{d_x}}{I_{d_1}},$$

$I_{d_x}$ is the intensity value of the direct component of the light incident on the pixel x when calibrating, $c_x$ is a constant calculated in advance according to formula $$c_x = \frac{P_x}{P_1},$$

$P_x$ is a power of the light source, x=1 . . . n, and wherein the direct component is a component of the light reflected one time from a scene object, and the global component is the component of the light reflected more than one time from the scene object; and performing for each pixel, image correction by assigning to each pixel its calculated intensity value of the direct component to obtain a corrected image.

16. The electronic computing device according to claim 15, the method further comprising:

determining a presence of a mirror in the scene based on an image distortion area in the corrected image by comparing the corrected image with a reference image, the reference image being formed in advance when capturing a scene in which light reflection more than one time is absent and illuminated with light having the same spatial patterns as in the corrected image; and determining a position of the mirror and a distance to the mirror with respect to the imaging sensor by processing the corrected image in which the presence of the mirror is determined by a trained artificial intelligence tool, the trained artificial intelligence tool being trained using a plurality of training images of a scene comprising a mirror from different viewpoints and different positioning of the mirror with indicating a position of the mirror and a distance to the mirror.

17. The electronic computing device according to claim 15, the method further comprising:

recognizing object materials of the captured scene by processing the corrected image by a trained artificial intelligence tool, the trained artificial intelligence tool being trained using a plurality of training images of objects from different materials and information on a material of an object in a training image of the plurality of training images.

18. The electronic computing device of claim 17, wherein the plurality of training images of objects are corrected images of different objects.

19. The electronic computing device of claim 18, wherein the information on the material of the object in the training image is a Bidirectional reflectance distribution function (BRDF) of the object in the training image for each training image of the plurality of training images.

20. The electronic computing device of claim 19, wherein reflectancies of different materials differ from each other, such that the BRDF specifies a particular material of the scene object.

* * * * *